(12) United States Patent
Zaidivar et al.

(10) Patent No.: US 8,916,067 B2
(45) Date of Patent: Dec. 23, 2014

(54) CARBONACEOUS NANO-SCALED MATERIALS HAVING HIGHLY FUNCTIONALIZED SURFACE

(75) Inventors: Rafael J. Zaidivar, Huntington Beach, CA (US); James P. Nokes, Torrance, CA (US); Hyun I. Kim, Yorba Linda, CA (US)

(73) Assignee: The Aerospace Corporation, El Segundo, CA (US)

( * ) Notice: Subject to any disclaimer, the term of this patent is extended or adjusted under 35 U.S.C. 154(b) by 260 days.

(21) Appl. No.: 13/276,942

(22) Filed: Oct. 19, 2011

(65) Prior Publication Data

US 2013/0099170 A1 Apr. 25, 2013

(51) Int. Cl.
| | |
|---|---|
| *H01B 1/04* | (2006.01) |
| *H05H 1/24* | (2006.01) |
| *C23C 14/58* | (2006.01) |
| *C08K 3/04* | (2006.01) |
| *B82Y 99/00* | (2011.01) |

(52) U.S. Cl.
CPC . *C08K 3/04* (2013.01); *B82Y 99/00* (2013.01); *Y10S 977/847* (2013.01)
USPC ......... 252/502; 252/511; 423/445 R; 977/847

(58) Field of Classification Search
CPC ........ H01B 1/04; H05H 1/24; C23C 14/5826; C01B 31/02; C01B 31/0253; C01B 31/0273; B82Y 40/00
USPC ........... 252/502, 510, 511; 977/847; 427/569, 427/535; 204/173, 157.15; 426/445 R
See application file for complete search history.

(56) References Cited

U.S. PATENT DOCUMENTS

| | | | |
|---|---|---|---|
| 4,272,464 A | 6/1981 | Asai et al. | |
| 4,311,838 A | 1/1982 | Imada et al. | |
| 4,315,808 A | 2/1982 | Imada et al. | |
| 4,317,984 A | 3/1982 | Fridlyand | |
| 4,344,981 A | 8/1982 | Imada et al. | |
| 4,395,434 A | 7/1983 | Imada et al. | |
| 4,678,681 A | 7/1987 | Obayashi et al. | |
| 4,722,816 A | 2/1988 | Ueno et al. | |
| 4,756,925 A | 7/1988 | Furukawa et al. | |
| 5,131,941 A | 7/1992 | Lemelson | |
| 6,057,414 A | 5/2000 | Razavi | |
| 6,419,995 B1 | 7/2002 | Kuckertz et al. | |
| 6,528,129 B1 | 3/2003 | Kondo | |
| 6,649,532 B1 | 11/2003 | Chen et al. | |
| 6,686,293 B2 | 2/2004 | Kim et al. | |

(Continued)

OTHER PUBLICATIONS

Kim et al "Effects of surface modification on rheological and mechanical properties of CNT/epoxy composites", Carbon 44 (2006) 18-98-1905.*

(Continued)

*Primary Examiner* — Mark Kopec
(74) *Attorney, Agent, or Firm* — Fulwider Patton LLP

(57) ABSTRACT

A method and composition wherein carbonaceous nano-scaled filler material is subjected to atmospheric plasma treatment using carbon monoxide as the active gas. The treatment with carbon monoxide plasma has been found to significantly increase the incorporation of oxygen groups on the surface of the filler material without degrading the surface and thus serves to increase wettability and dispersion throughout the matrix. The composite that incorporates the treated filler material has enhanced mechanical and electrical properties.

20 Claims, 4 Drawing Sheets

(56) References Cited

U.S. PATENT DOCUMENTS

| | | |
|---|---|---|
| 6,849,306 B2 | 2/2005 | Fukuda et al. |
| 6,998,103 B1 | 2/2006 | Phillips et al. |
| 7,056,479 B2 | 6/2006 | Dodelet et al. |
| 7,125,525 B2 | 10/2006 | Mauro |
| 7,132,039 B2 | 11/2006 | Anazawa et al. |
| 7,482,275 B2 | 1/2009 | Ohshima et al. |
| 7,585,584 B2 | 9/2009 | Choi et al. |
| 7,758,928 B2 * | 7/2010 | Bunce et al. ............ 427/562 |
| 7,880,376 B2 | 2/2011 | Takai et al. |
| 7,955,515 B2 | 6/2011 | Raghuram et al. |
| 2003/0150713 A1 | 8/2003 | Kado |
| 2006/0156983 A1 * | 7/2006 | Penelon et al. ........... 118/723 E |
| 2011/0021011 A1 | 1/2011 | Sweeney et al. |
| 2013/0224377 A1 * | 8/2013 | Jensen ........................ 427/237 |

OTHER PUBLICATIONS

Bubert et al "Characterization of the uppermost layer of plasma-treated carbon nanotubes", Diamond and Related Materials 12(2003) 811-815.*

* cited by examiner

CARBONACEOUS NANO-SCALED MATERIALS HAVING HIGHLY FUNCTIONALIZED SURFACE

The present invention is directed to the treatment of carbonaceous nano-scaled material so as to render its surface highly functionalized. The resulting material is more readily incorporated in and dispersed throughout a resin matrix to form a composite with enhanced electrical and mechanical properties.

BACKGROUND

Composites that have incorporated therein filler material comprised of carbonaceous nano-scaled materials, such as carbon nanotubes and graphene, have held great promise due to the superior electrical and mechanical properties of such materials. However, the hoped for results have seldom been realized. As an example, while moderate increases in stiffness have been achieved, the strength and strain to failure of the matrix are usually degraded. The disappointing performance has been attributed to the inadequate wettability of the filler material's surface as well as the poor dispersion of the carbonaceous filler material throughout the matrix.

Various processing remedies have been explored, including ultrasonication, chemical acid treatments, fluorination, amine-functionalization and oxygen vacuum plasma treatment, but have yielded limited success. The primary mechanism for most of these treatments is to incorporate oxygen containing groups on the surface of the material in order to modify the surface energetics and wetting in an effort to improve distribution within a matrix. However, such techniques have been shown to introduce defects and degrade the delicate structure of the nano-scaled reinforcement material. Not only are mechanical properties adversely affected, but damage to the outer walls of these materials has been shown to also negatively impact electrical property performance by reducing percolation pathways.

Atmospheric plasma treatment has also been explored as a means for treating the surface of a material in an effort to enhance wetting and dispersion. Such treatment is generally desirable as it requires minimal operator intervention, is performed at atmospheric pressure, can be applied to complex shapes and has been shown to modify and incorporate specific functional groups onto the surface of a hydrophobic material which results in improvements in wetting, tenacity, bond strength and fracture toughness. The treatment is typically performed using an active gas such as oxygen, nitrogen, water, ammonia or carbon dioxide. Unfortunately, even using oxygen or carbon dioxide as the active gas has been shown to be of limited utility as the degree of oxygen incorporation is minimal and even with the low degree of incorporation, damage of the graphitic structure is substantial and has been shown to negatively impact both electrical as well a mechanical performance.

A method for enhancing the wettability and dispersion of carbonaceous nano-scaled filler material in a resin matrix is therefore needed. A composite having such material incorporated therein would be expected to yield improved mechanical and electrical properties.

SUMMARY OF THE INVENTION

The present invention provides a method for treating carbonaceous nano-scaled material so as to substantially modify its surface with the incorporation of functional groups thereon without degrading the underlying material. The resulting composition is rendered significantly more wettable than had heretofore been possible and its dispersability throughout for example a resin matrix is thereby greatly enhanced. The enhanced dispersion throughout a matrix and the absence of damage to the carbonaceous material serves to preserve the filler material's inherent mechanical and electrical properties allowing such material to more effectively impart such properties to the resulting composite material.

The method of the present invention provides for the atmospheric plasma treatment (APT) of carbonaceous nano-scaled filler material using carbon monoxide as the active gas. While only minimal gains in terms of the functionalization of the surface of the material have heretofore been realized with the use of vacuum plasmas and with the use of atmospheric plasmas relying on other active gases as sources of oxygen, the minimal gains have typically been accompanied by a significant deterioration of the material. The use of carbon monoxide as the active gas in the atmospheric plasma treatment of the carbonaceous nano-scaled material has however unexpectedly been found to not only achieve significant gains in the oxygen to carbon (O/C) ratio but to cause only minimal or no damage or degradation to the carbonaceous material. Such unexpected results have not been found to be achievable using carbon monoxide plasma under vacuum. Subsequent incorporation of the treated carbonaceous material within a resin, and more particularly, a polar resin yields improved dispersion of the undamaged filler material and provides a composite having mechanical and electrical properties that more closely approach that which would be expected in view of the desirable mechanical and electrical properties inherent in the carbonaceous nano-scaled filler material.

Without intending to be bound to any theory, this unexpected result may be due to the high bond energy and a unique dissociation behavior that allows the carbon monoxide molecule to become activated at atmospheric pressure without completely dissociating to an oxygen radical as is the case with other typically used active gases and/or at sub-atmospheric pressures. It is contemplated that the unexpected ability of the carbon monoxide to become activated in plasma and incorporated as carbonyl groups onto the surface of the treated material without exhibiting any of the degradation characteristics that result from the use of other plasmas that produce atomic oxygen can have many beneficial applications for sensitive materials including for example natural fibers, textile fibers, as well as living tissue for biological and medical uses.

These and other advantages of the present invention will become apparent from the following detailed description of preferred embodiments which, taken in conjunction with the drawings, illustrate by way of example the principles of the invention.

DETAILED DESCRIPTION OF THE PREFERRED EMBODIMENTS

The present invention provides for the surface modification of any of various carbonaceous nano-scaled filler materials, such as graphitic nanoparticles, nanoplatelets, nanotubes, graphene and the like so as to substantially increase the incorporation of oxygen containing functional groups on the surface of the material without damaging the material. The treatment enhances the wettability of the filler material, enhances its ability to disperse throughout a matrix material and improves interfacial bond strength, all without damaging or degrading the filler material. A composite incorporating filler material treated in accordance with the methods of the present invention has improved mechanical and electrical properties.

The carbonaceous nano-scaled filler material is subjected to atmospheric plasma treatment (APT) using carbon monoxide (CO) as the active gas. The filler material may be treated in bulk form wherein the plasma emitting nozzle or wand of the APT unit is inserted directly into a container containing the powdered filler material and passed thereover. Alternatively, more efficient contact methods may be employed including for example the fluidization of the bulk filler material. The material may first be subjected to a pretreatment wherein only inert carrier gas is emitted by the APT unit. Subsequently thereto, the material is treated by being subjected to a flow from the APT unit that includes a combination of the carbon monoxide active gas and an inert carrier gas. The treated filler material may subsequently be incorporated in a resin matrix, preferably a thermosetting matrix such as a polycyanurate, by techniques that are well known in the art to form a composite. As an additional alternative, optional pretreatment or co-treatment using $O_2$ and $CO_2$ also may be used to clean the surface and minimize competing plasma-induced deposition.

An atmospheric plasma unit used in the preferred embodiment is preferably operated at 13.56 MHz with power setting of 80-160 W. The carbon monoxide flow rate should range from about 0.1 to 0.8 L/min with an inert carrier gas, such as helium or argon, flowing at a rate of about 10-40 L/min. This process is preferably performed for a period of time ranging from 1-10 minutes. The working distance of the nozzle to the substrate should be held within a range of from about 1 mm to a maximum of 5 mm.

The unexpected results achieved by the method of the present invention are evidenced by X-ray photoelectron spectroscopy, scanning electron microscopy, scanning tunneling microscopy and by contact angle measurements.

Figure 1:
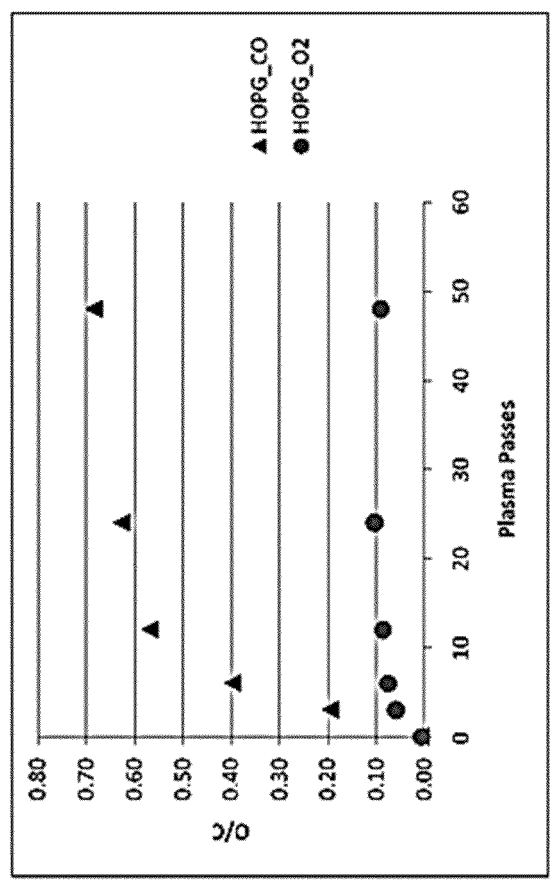
FIG. 1 is a plot of the O/C ratios for HOPG specimens as determined by X-ray photoelectron spectroscopy.

A series of tests were performed on Highly Oriented Pyrolytic Graphite (HOPG) using $O_2$ and CO plasma at atmospheric pressure. HPOG is an excellent model to simulate a graphene or carbon nanotube surface. FIG. 1 illustrates the O/C ratio for $O_2$ and CO treated specimens as determined by X-ray photoelectron spectroscopy. As is illustrated in the plots, the difference in oxygen incorporation is striking to the extent that the maximum O/C ratio for the $O_2$ treated sample is approximately 0.15 while the maximum O/C ratio for the CO treated specimen that is achieved with a similar duration of treatment (twelve passes) is 0.71. As such, the CO treated specimens unexpectedly achieve an O/C ratio that is approximately five times that of the $O_2$ treated specimen.

Figure 2B:
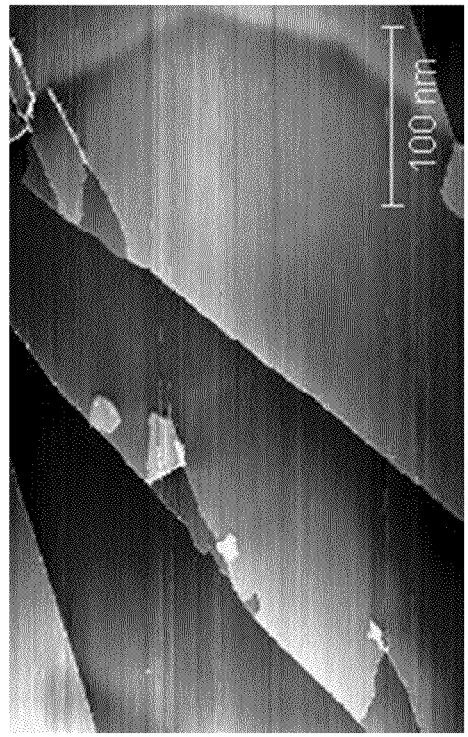
FIGS. 2A and 2B are scanning electron microscopy images of plasma treated HPOG specimens.
Figure 2A:
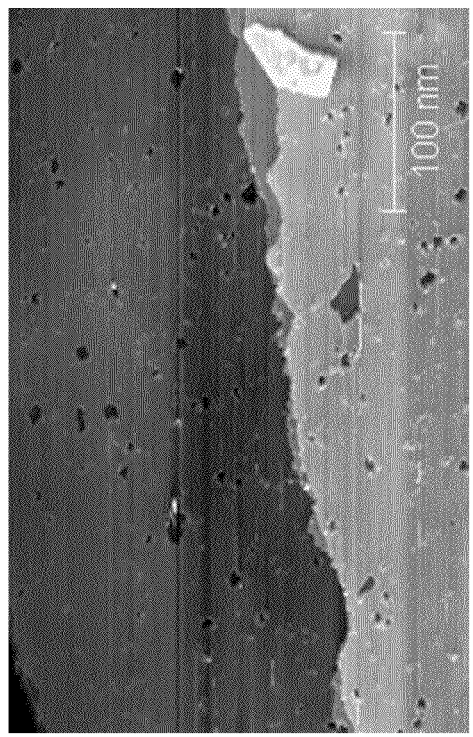

A further unexpected result is evident in the scanning electron microscopy images showing the microstructure of the surface of an $O_2$ plasma treated sample (FIG. 2A) and the surface of an CO plasma treated sample (FIG. 2B), both having been subjected to the same number of passes. In this example, the samples were treated to twelve passes. While substantial damage in the form of surface pitting is evident in the $O_2$ plasma treated specimen, the surface of the CO plasma treated specimen appears more pristine. Accordingly, the tests indicate that the substantial improvement in O/C ratio that is achieved with the use of CO plasma treatment over $O_2$ plasma treatment is achieved without damage to the microstructure of the graphitic basal plane, therefore achieving a high degree of surface chemical modification without compromising mechanical or electrical properties. The use of CO plasma treatment functionalizes the surface with oxygen-containing groups while avoiding damage to the nano structure of the material.

Additional testing was conducted using Raman spectroscopy on O2 and CO atmospheric plasma treated specimens. The technique allows for the evaluation of the degree of disordered to ordered graphite that is created due to the treatment. A disordered peak (D) and an ordered peak (G) can be used to quantify changes. The O2 treatment was shown to severely impact the crystal structure and thus its mechanical and electrical behavior. In contrast thereto, the CO treated specimens showed no adverse changes in disorder to the graphite planes after treatment despite the fact that the surface had been rendered very hydrophilic.

The extent to which oxygen is incorporated on the surface of the material is dependent upon the combination of power, the CO/He ratio and the CO content that is selected, ranging from the deposition of isolated carbonyl groups to a deposit of a nanometer scaled highly oxygenated film throughout the filler. The surface of the carbonaceous remains substantially devoid of damage or degradation irrespective of the extent of functionalization.

The use of carbon monoxide as the active gas in the atmospheric plasma treatment of the surface of composites has yielded unexpected results similar to those observed with the previously discussed carbon monoxide plasma treatment of graphitic materials. Higher O/C ratios are achievable while damage to the composite surface in the form of chain scission and ashing is kept to a minimum. Water contact angle measurements provide a good indication of the extent of the surface modification of a polymer as the more hydrophilic the surface becomes, its wettability increases which results in a smaller water contact angle. Table 1 provides a tabulation of water contact angle measurements of the surface of a polycyanurate composite which is used extensively for aerospace and satellite applications.

TABLE 1

| | Water contact angle after APT and after solvent rinse | | | | |
| --- | --- | --- | --- | --- | --- |
| Passes | 0 APT/after rinse | 6 APT/after rinse | 12 APT/after rinse | 24 APT/after rinse | 48 APT/after rinse |
| $O_2$ | 84/84 | 24/50 | 14/49 | 13/50 | 12/49 |
| $CO_2$ | 84/85 | 25/37 | 15/39 | 11/41 | 12/48 |
| CO | 84/85 | 28/30 | 14/15 | 14/16 | 13/20 |

As is evident in the table, repeated treatment of the resin by $O_2$, $CO_2$ and CO plasmas all serve to bring about a decrease in the water contact angle which is indicative of an increasingly oxygen rich surface. However, what is unexpected is that, after rinsing with isopropyl alcohol (IPA), the CO plasma treated surface essentially maintains its level of oxygen enrichment while the $O_2$ and $CO_2$ plasma treated surface show a substantial decline. This would suggest that the substantial portion of the contributions to the surface oxygen of the $O_2$ and $CO_2$ plasma treated surfaces are a result of weakly adhered ash.

Figure 3B:
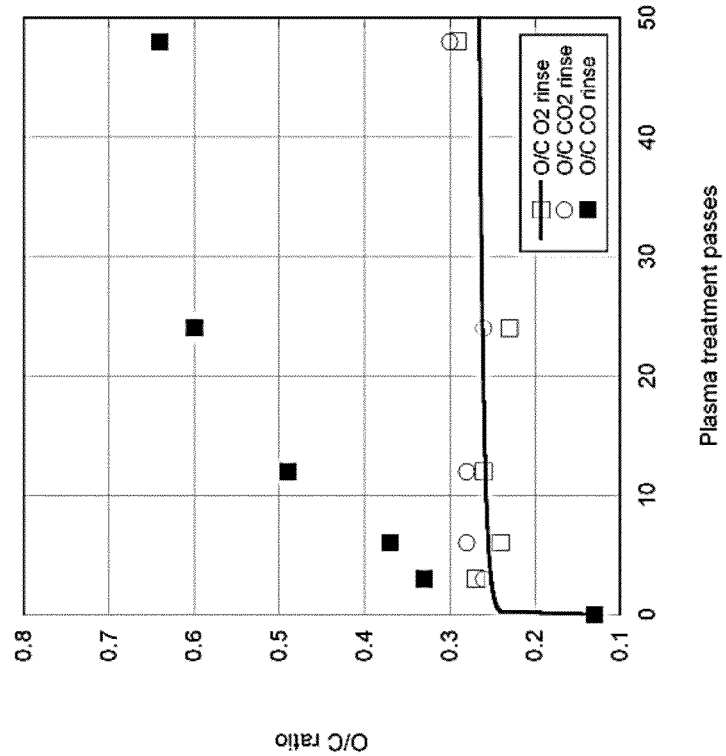
FIGS. 3A and 3B are plots of O/C ratio as a function of plasma treatment passes.
Figure 3A:
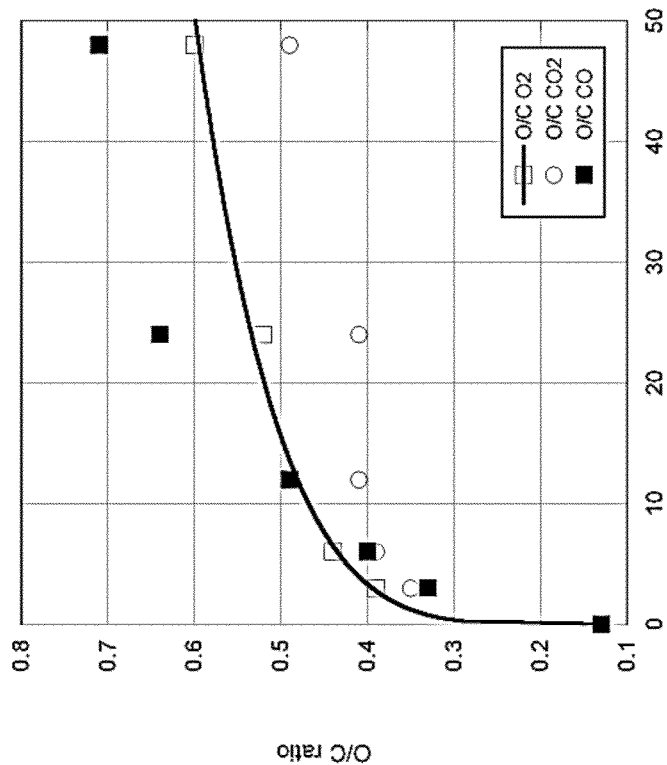

FIGS. 3A and 3B further support the results shown in Table 1 with surface O/C ratio measurements plotted as a function of plasma passes without rinsing (FIG. 3A) and with rinsing (FIG. 3B). For the resin system tested, an O/C ratio of 0.1 is typical for a hydrophobic material. As is shown, as the duration of treatment (i.e., number of passes) increases the amount of oxygen on the surface increases which is consistent with the conversion to a hydrophilic system. It is to be noted that much more oxygen is being incorporated in the surface of the CO plasma treated material than the materials that are treated with $O_2$ or $CO_2$ plasmas. What is also unexpected is that a rinsing of the treated surfaces reveals that the CO plasma treated material retains much more surface oxygen than either the $O_2$ or $CO_2$ plasma treated materials, confirming the water angle measurement experiments that the $O_2$ and $CO_2$ plasma treated surfaces incur significant damage in the form of chain scission and that the pre-rinse surface oxygen is more likely attached to weakly adhered ash. This again suggests that a sensitive system can be highly modified so as to modify its surface characteristics without damaging the polymer substrate.

Figure 4:
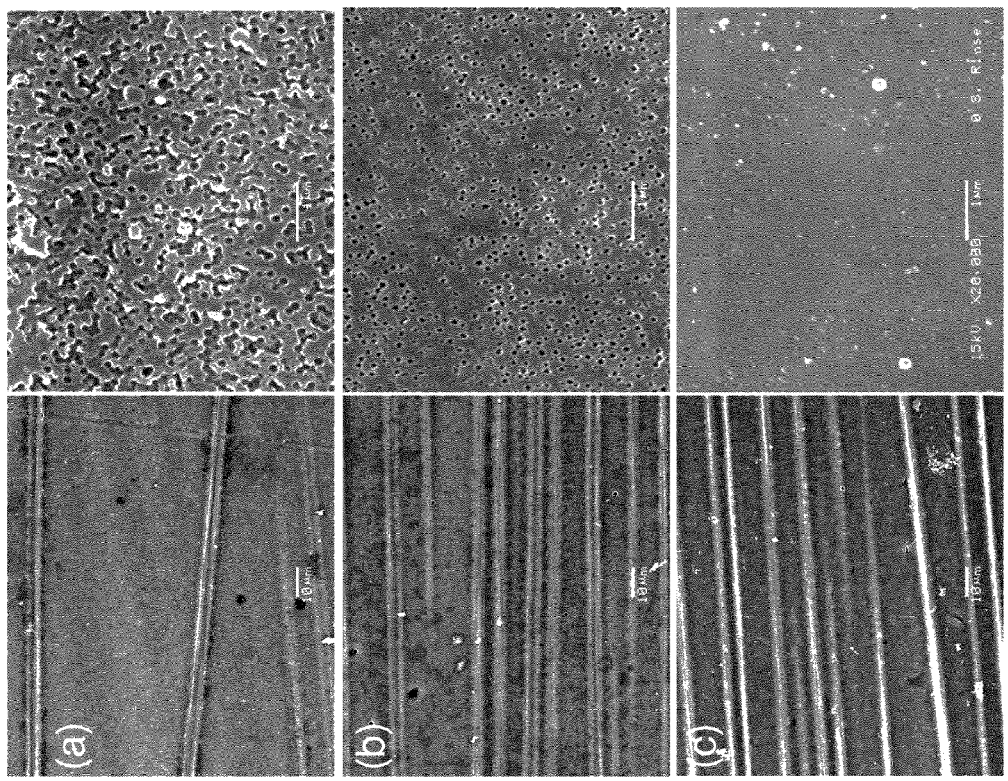
FIGS. 4a-c are scanning electron microscopy images of plasma treated surfaces.

Scanning electron microscopy images were also taken of the treated surfaces to determine if any oxidation damage or degradation of the resin surface was directly observable after treatment. FIG. 4 are low and high magnification images wherein FIG. 4a shows the surface of resin material treated with $O_2$ plasma, FIG. 4b shows the surface of resin material treated with $CO_2$ plasma, and FIG. 4c shows the surface of resin material treated with CO plasma. As is clearly visible, after $O_2$ plasma treatment there is evidence of oxidative degradation on the surface of the composite in the form of interconnected pitting. The $CO_2$ plasma treated surface shows the same type of attack, although the degree of pitting is somewhat smaller and more isolated. Unexpectedly, the CO plasma treated surface shows no signs of degradation. Despite the fact that the CO plasma treated surface has the highest degree of incorporated oxygen and exhibits excellent and stable wetting characteristics, the treatment does not translate into the type of degradation observed when using the types of gases that are typically used for APT. This treatment allows the conversion of sensitive hydrophobic surfaces using atmospheric plasma treatment without the type of degradation associated with atomic oxygen attack.

While particular forms of the invention have been described and illustrated, it will also be apparent to those skilled in the art that various modifications can be made without departing from the spirit and scope of the invention. For example, the atmospheric plasma treatment using carbon monoxide as the active gas is not limited to applications involving the treatment of carbonaceous nano-scaled filler material for incorporation in a resin matrix, nor for the treatment of the surface of composites but can be of benefit for the treatment of natural fibers for incorporation in composites, for the treatment of various textiles, for the surface modification of graphene and carbon nanotubes used in sensors, for biological applications such as the incorporation of tumor targeted medications on graphene substructures and medical applications including bacterial inactivation and treatment of chronic wounds by controlled stimulation of tissue wherein selective antimicrobial activity can be achieved with damaging surrounding tissue. Accordingly, it is not intended that the invention be limited except by the appended claims.

What is claimed is:

1. A method for incorporating oxygen functional groups on a surface of carbonaceous nano-scaled material comprising: subjecting said material to atmospheric plasma treatment using carbon monoxide as active gas flowing at a rate in the range of 0.1 to 0.8 L/min, in combination with a carrier gas flowing at a rate in the range of 10 to 40 L/min.

2. The method of claim 1, wherein said carbonaceous nano-scaled material comprises nanotubes.

3. The method of claim 1, wherein said carbonaceous nano-scaled material comprises graphene.

4. The method of claim 1, wherein said oxygen functional groups comprise carbonyl groups.

5. The method of claim 1, wherein helium is said carrier gas in combination with said active gas at a preselected ratio for increasing hydrophilic properties of carbonaceous nano-scaled material without degrading said material.

6. The method of claim 1, wherein said atmospheric plasma treatment in said subjecting step further includes using carbon monoxide as active gas flowing at 0.1 L/min.

7. The method of claim 1, wherein said atmospheric plasma treatment in said subjecting step further includes using carbon monoxide as active gas flowing at 0.8 L/min.

8. The method of claim 1, wherein during said step of subjecting said material to atmospheric plasma treatment using carbon monoxide as active gas, said material is not degraded by chain scission of the material's surface.

9. The method of claim 1, wherein during said step of subjecting said material to atmospheric plasma treatment using carbon monoxide as active gas, said material is not degraded by ashing of the material's surface.

10. A method for forming a composite, comprising:
providing a carbonaceous nano-scaled material;
subjecting said carbonaceous material to atmospheric plasma treatment with carbon monoxide as active gas flowing at a rate in the range of 0.1 to 0.8 L/min, in combination with a carrier gas flowing at a rate in the range of 10 to 40 L/min;
incorporating said treated carbonaceous material within a resin to form the composite.

11. The method of claim 10, wherein said atmospheric plasma treatment with carbon monoxide as the active gas is conducted under conditions so as to incorporate oxygen containing groups on a surface of said carbonaceous material.

12. The method of claim 11, wherein said oxygen containing groups comprise carbonyl groups.

13. The method of claim 10, wherein said atmospheric plasma treatment with carbon monoxide as the active gas is conducted under conditions so as to render said carbonaceous nano-scaled material hydrophilic without degrading said carbonaceous nano-scaled material.

14. The method of claim 10, further comprising the step of subjecting said composite to atmospheric plasma treatment with carbon monoxide as an active gas so as to increase the hydrophilicity of said composite.

15. The method of claim 10, wherein said carbonaceous material comprises carbon nanotubes.

16. The method of claim 10, wherein said carbonaceous material comprises graphene.

17. The method of claim 10, wherein said resin comprises a polycyanurate.

18. The method of claim 10, wherein said atmospheric plasma treatment further employs helium or argon as a carrier gas.

19. The method of claim 10, wherein said carbonaceous material is pretreated with an inert carrier gas prior to treatment with said carbon monoxide.

20. The method of claim 10, further comprising subjecting said composite to atmospheric plasma treatment using carbon monoxide as the active gas.

* * * * *

UNITED STATES PATENT AND TRADEMARK OFFICE
CERTIFICATE OF CORRECTION

| | | |
|---|---|---|
| PATENT NO. | : 8,916,067 B2 | Page 1 of 1 |
| APPLICATION NO. | : 13/276942 | |
| DATED | : December 23, 2014 | |
| INVENTOR(S) | : Rafael J. Zaldivar, James P. Nokes and Hyun I. Kim | |

It is certified that error appears in the above-identified patent and that said Letters Patent is hereby corrected as shown below:

Title Page: Item 12 "Zaidivar" should be --Zaldivar--

Title Page: Item 75 First Named Inventor should be --Rafael J. Zaldivar--

Signed and Sealed this
Fifth Day of May, 2015

Michelle K. Lee
*Director of the United States Patent and Trademark Office*